COMPARATOR (500)

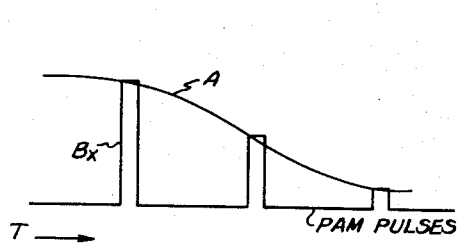
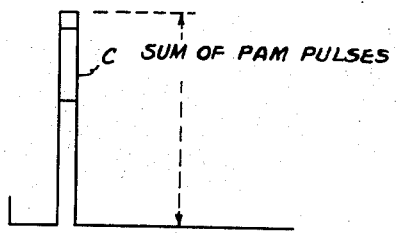
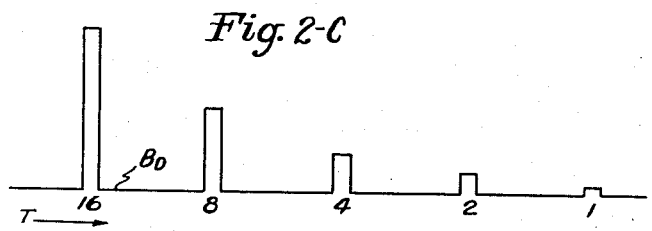
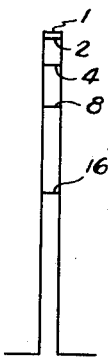
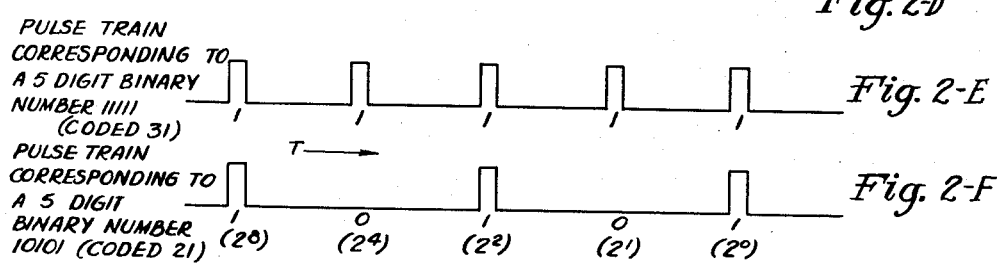
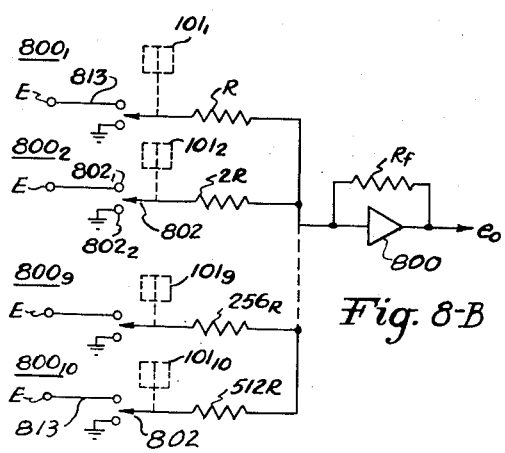
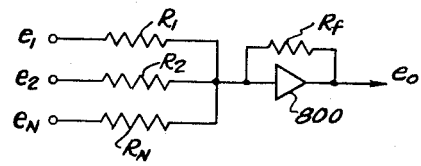
INVENTOR
Arnold Lesti
Andrew R. Baechtel
BY Arthur Vinograd
ATTORNEY July 12, 1960
A. LESTI ET AL
2,945,220
ANALOGUE-DIGITAL CONVERTER
Filed March 9, 1955
8 Sheets-Sheet 3
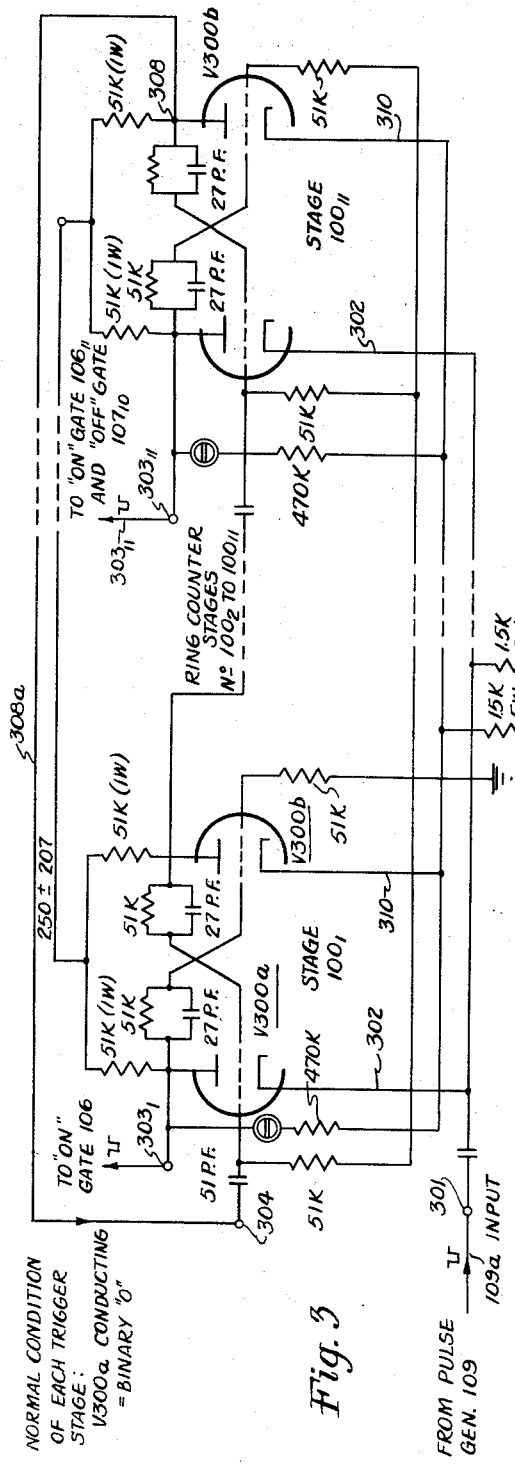
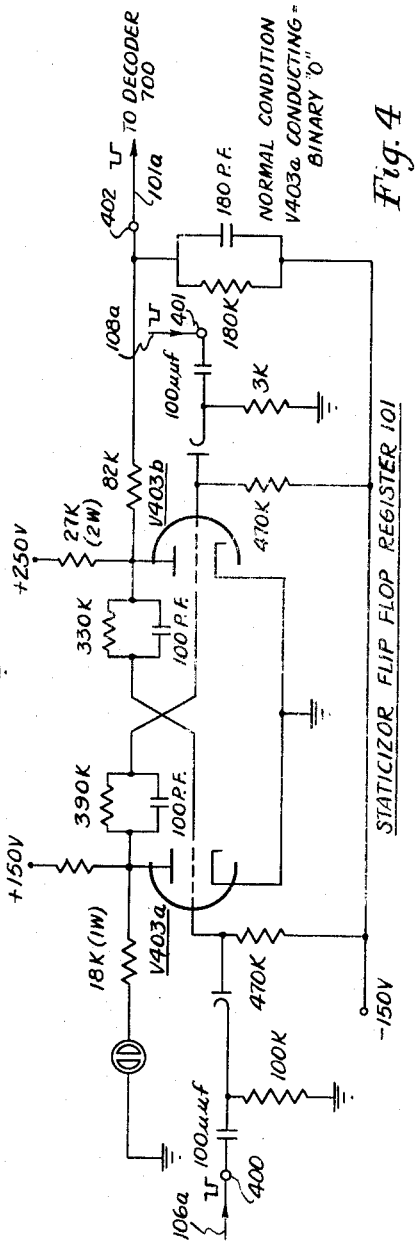
INVENTOR
Arnold Lesti
Andrew R. Baechtel
BY Arthur Vinograd
ATTORNEY

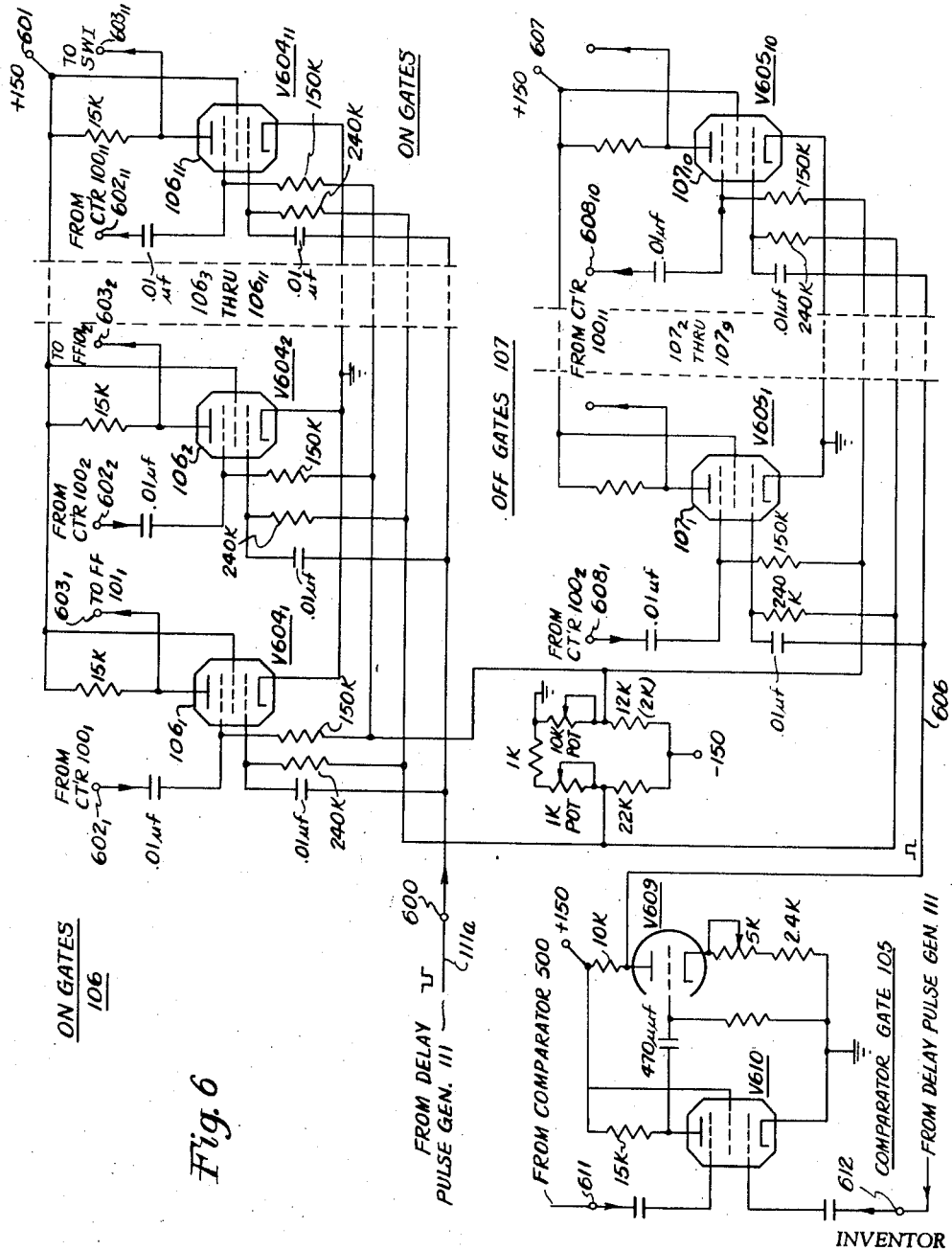

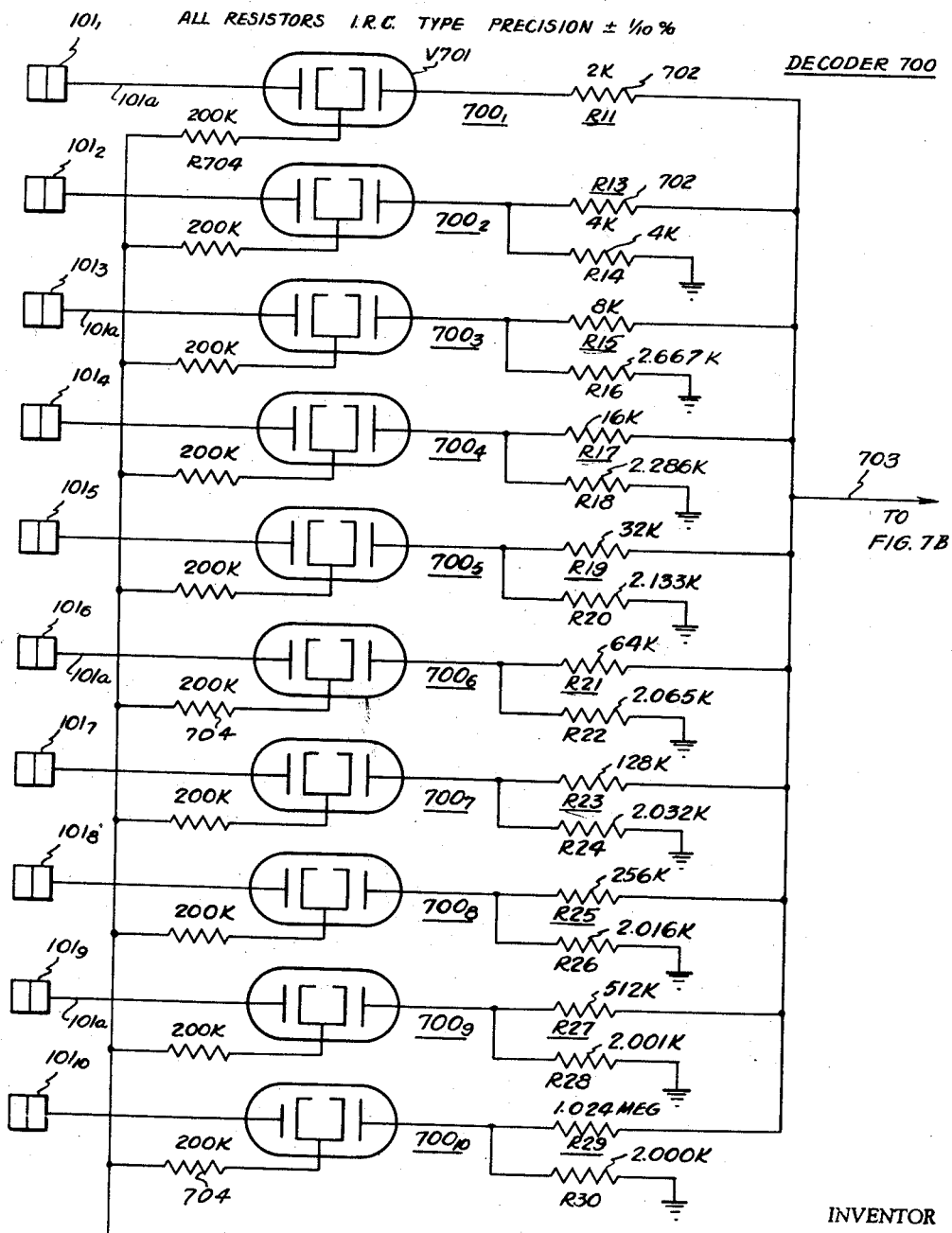
Fig. 7-A

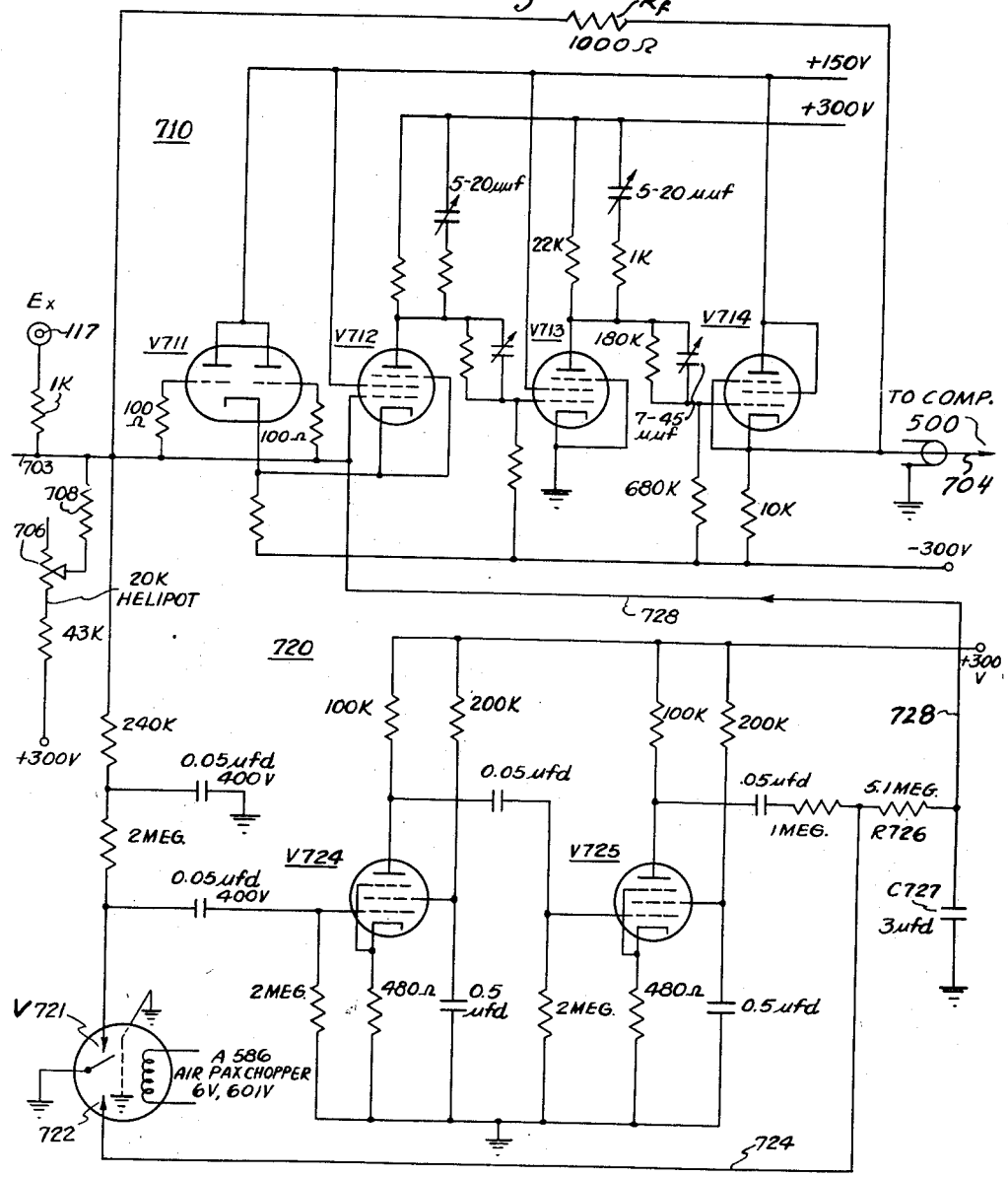
Fig. 7-B
DECODER 710, 720

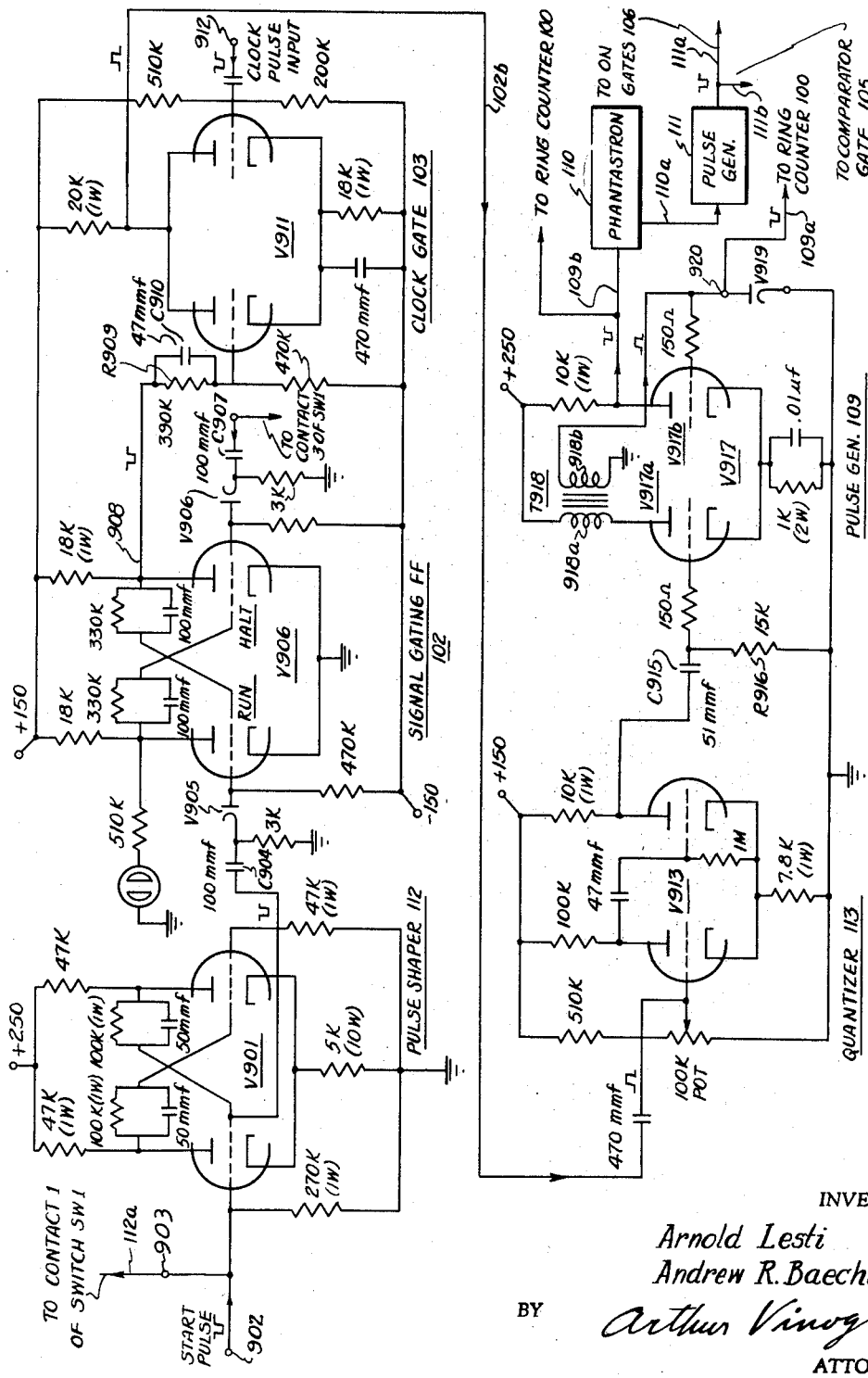

United States Patent Office 2,945,220
Patented July 12, 1960

2,945,220
ANALOGUE-DIGITAL CONVERTER

Arnold Lesti, Arlington, Va., and Andrew Robert Baechtel, Wheaton, Md., assignors to the United States of America as represented by the Secretary of Commerce Filed Mar. 9, 1955, Ser. No. 493,314

10 Claims. (Cl. 340—347)

This invention relates to the art of coding and is particularly directed to an improved analogue to digital information coding or converting apparatus. In applications involving communications or information handling it is often necessary to express observed or measured data as information in discrete pulse coded form. The coder according to this invention is an analogue-to-digital converter which translates applied analogue signal voltages to corresponding binary coded digits as an output. The output may consist of either serial or parallel binary codes.

In general, converters of the type with which this invention is concerned operate on the principle of pulse code modulation by measuring or sampling the voltage-amplitude of a data-representing signal and comparing the sampled signal with a standard signal corresponding in magnitude to the highest order-level digit in a coded representation. The standard signal is then subtracted if it is smaller than the sampled signal and the remainder of the sampled signal is then compared with a second standard signal corresponding with the next lower order-level digit in the coded representation, and a second subtraction is made if the magnitude of the sampled signal still exceeds that of the standard. Such process is continued until the lowest order, or unit digit, is compared with the remainder.

As compared with known systems, the present invention employs a novel arrangement of a new digital-to-analogue converter or decoder in combination with an improved comparator. The efficacy of the coder as a whole is largely dependent upon such units while the remaining circuitry is digital in nature with its consequent reliability and accuracy.

It is therefore an object of this invention to provide an analogue-to-digital coder or conversion device which combines high accuracy, high reliability and high speed of operation to a degree not attainable by previous systems. While the circuitry employed in the disclosed embodiment of the invention has been built to operate at approximately a rate of 25,000 10-bit codes per second, or 22,000 11-bit codes per second, the principles and techniques involved may readily be extended for operation at substantially higher speeds and the accuracy may be increased to 12 bits.

It is a further object of this invention to provide a coder which is digital in operation. Except for the decoder and comparator elements employed in the invention, which are partly analogue in principle, the converter according to this invention operates in a digital manner to achieve a high degree of accuracy and speed.

Another object of this invention is to provide a coder which performs substantially as many basic operations as there are "bits" in the code. An advantageous high degree of speed of operation is thereby attained as compared with coding devices which must execute as many operations as the full code count. For example, employing a clock rate of 250 kc. or 4 μs. period, a 10-bit code requires 40 μs. coding time, which is equivalent to 25,000 10-bit codes per second, as compared to a full count device which would require a 25 mc. counter. Moreover, the advantages of the coding device of the present invention increase rapidly with increased "bits" and speed.

An additional object of this invention is to provide as an adjunct to the coder, a decoder mechanism which operates in a novel manner to translate digital information into analogue voltage-amplitude signals with a high degree of precision, accuracy and stability.

Further objects will be made apparent in the following description in which:

Figs. 2a–2f illustrate the manner in which pulse techniques are utilized in accordance with the present invention;

Fig. 3 shows the circuit of a ring counter as employed in the present invention for signal commutating purposes;

Fig. 4 is a diagram of a bistable circuit employed as a staticizer in the present invention;

Figure 1:
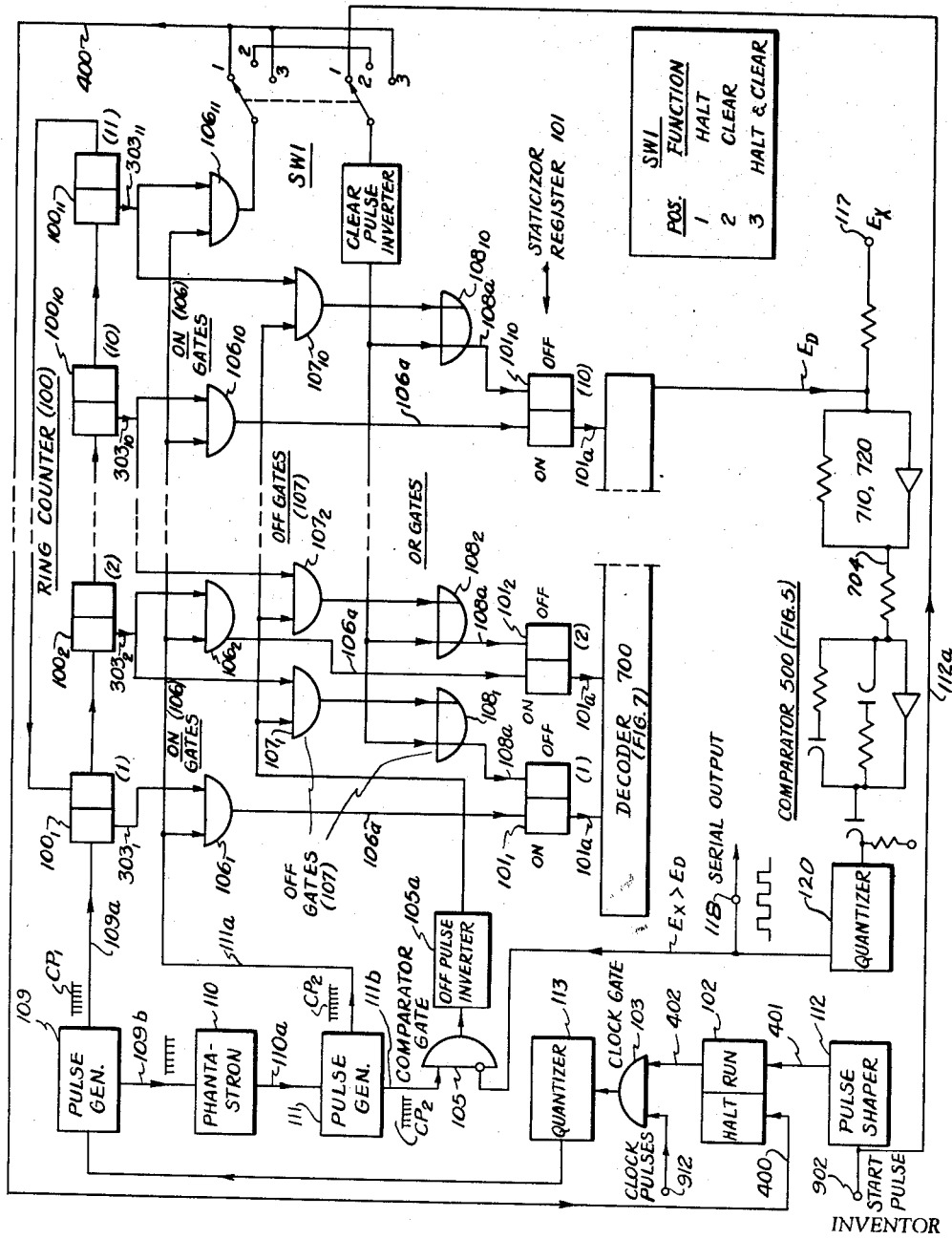
Fig. 1 is a block diagram showing the general arrangement of elements comprising the analogue-to-digital converter according to the present invention.

Fig. 6 details the construction of the "On" and "Off" gates and the relation of such gates in the circuit of Fig. 1;

Figs. 7a–7b, which are to be considered together, show the construction of the novel decoder mechanism employed with the present invention for translating digital information signals into corresponding analogue voltage-amplitude signals;

Figs. 8a–8b shown below Figs. 2a–2f are explanatory circuits showing the principles of operation of the decoder circuit shown in Figs. 7a and 7b; and Fig. 9 shows some of the control circuits employed.

*Principles involved*

It is well known, according to time-division principles, that any voltage-amplitude signal waveform can be represented by a series of regularly occurring instantaneous sampling pulses and, by amplitude quantization, a complex wave can be approximated by a wave consisting of a finite number of pulses having various predetermined amplitude levels, each differing by a predetermined ratio. These principles are illustrated in Figs. 2a and 2b where curve A symbolizes an input analogue voltage-amplitude signal which may be quantized by sampling the waveform on a time-division basis with a pulse amplitude modulated wave $B_x$. The latter comprises a series of equally time-spaced pedestals, each having an amplitude corresponding to the instantaneous amplitude of the signal at a corresponding time interval. As is apparent, the sampling wave $B_x$ has a finite number of different amplitude levels, the size of each level being determined by the degree of approximation desired.

It is apparent that the sampling pulses $B_x$ have a definite quantized amplitude made up of the various sampling pulse levels, as shown at C in Fig. 2b, which may be represented by an integer number. For convenience such integer number may be expressed in the binary system of notation, each integer being represented as a binary number of $n$ digits. Thus, if the waveform $B_x$ in Fig. 2a is comprised of $2^n$ discrete pulse levels, it can be defined by a binary number having $n$ digits. Therefore, by employing a binary system the digit manifestations may readily be mechanized by any convenient on-off device as is well known.

In a binary coded decimal system, the binary equivalent of a decimal number is obtained by expressing the decimal number as powers of 2, the powers of 2 being 1, 2, 4, 8, 16, etc. It follows therefore that a plurality of standard pulse levels, each also differing from another by a predetermined value corresponding to the difference between adjacent $2^n$ values respectively would each have assigned thereto a value corresponding to such progression. Such arrangement is indicated by the standard waveform $B_d$ in Fig. 2c in which each of the equidistantly spaced pulse levels are chosen to have quanta proportional to the values 1-2-4-8-16 etc., as shown. The curve therefore represents the weighted equivalent of the binary number 31. The decoded number 31 would be represented in amplitude quantized form as shown in Fig. 2d, which represents the sum of each of the pulses. It is also apparent that, in accordance with the system of notation employed, each digit is one weight greater than the sum of all the digits which precede it. Thus 8 equals the sum of 1, 2, and 4 plus 1.

Comparing the standard waveform $B_d$ in Fig. 2c with the unknown sampling waveform $B_x$ shown in Fig. 2a, it is apparent that each of the pulse amplitudes comprising curve $B_x$ can be compared with the standard pulse levels represented by the corresponding curve $B_d$ of Fig. 2c, and the result of such comparison will evolve into a binary coded representation of the analogue signal A. The curve of Fig. 2c therefore shows each standard or reference pulse weighted according to an assigned value in accordance with the binary system of notation. In other words, each pulse represents the weighted equivalent of a corresponding digit pulse corresponding to a given order. By taking different combinations of the five digits employed, by way of example, all integer amplitudes between 0 and 31 can be represented. While only 5 digit values have been employed in the example illustrated in Fig. 2, it is obvious that the equation $2^n$, which determines the number of digits in the coded binary word can be expanded to include as many digits as may be found desirable.

Thus, if it should happen that the analogue waveform A in Fig. 2a, upon analysis, is represented in quantized form by a decoded integer corresponding to "31," a binary code pulse representation such as shown in Fig. 2e denoting the binary digit 11111 would result. Similarly, if the analysis should indicate a quantized "21" the binary digit representation thereof would be 10101, shown in Fig. 2f.

The apparatus of the present invention generally employs the above-discussed principles to secure a binary coded representation of an applied analogue input signal by (1) sampling the analogue signal as a series of multi-level pulses of the type $B_x$ in Fig. 2a, and (2) analyzing the sampling pulses by comparison with standard code pulses of the general type demonstrated in Fig. 2c.

*Over-all description (Fig. 1)*

The converter employs a staticizer in the form of a series of bistable flip-flop signal storing circuits 101 corresponding, respectively, to the binary digits of the coded representation. The ring counter 100 functions as a commutator to sequentially register standardizing signals progressively in each flip-flop stage of the staticizer register 101. These standardizing signals represent in order of decreasing magnitude, the standard signals of varying quantum proportional to the $2^n$ values represented by the pulse train $B_d$ in Fig. 2c. The staticizer 101 is connected through a digital-to-analogue decoder 700, including the amplifier 710, 720, to a comparator device 500. The decoder 700 first derives a standard voltage signal $E_d$ having a magnitude corresponding to the level of the highest order digit registered in the stage $101_1$ of staticizer 101. The measured or sampled analogue voltage signal $E_x$ is applied as a second input to the comparator 500 and is compared with the standard voltage signal. If a different signal is detected by the comparator, an output is manifested in the form of a signal which is fed back to the stages of the staticizer 101 through a signal gating arrangement. Thus, if the sampled voltage $E_x$, Fig. 1) is determined to be greater in amplitude than the decoded standard voltage ($E_d$) obtained from the staticizer, the registration in the staticizer stage $101_1$ representing the highest order level in the staticizer is maintained and the next lower order level staticizer flip-flop stage $101_2$ is energized. On the other hand if the decoded standard signal $E_d$ should exceed the sampled signal $E_x$, the highest order level flip-flop $101_1$ is reset when the next lower order staticizer stage $101_2$ is energized. In this manner the decoder keeps translating the code established by each of such settings of the staticizer stages, and the comparator 500 continuously compares the decoded standard signal $E_d$ with the sampled voltage signal and continues to manifest a control on the stages of the staticizer 101 according to the described pattern. The sequence continues until all stages of the staticizer 101 have been analyzed, and the final registration of the staticizer stages comprises a parallel binary coded representation of the applied input signal, which is the desired output.

As will be made apparent, the pulses derived from the described comparison action each time the magnitude of the sampled signal $E_x$ exceeds the signal $E_d$ derived from the decoder, constitute a binary coded serial train of output pulses which is also available as an output at terminal 118 in Fig. 1.

Upon the completion of a coding operation, the flip-flop stages of staticizer 101 are reset and a new coding cycle may be initiated.

The above objectives are achieved by the coder or converter mechanism generally illustrated in Fig. 1 which comprises the components now to be described in detail. Following such description, the overall construction and operation of the apparatus of the present invention will become readily apparent.

*Ring counter 100 (Fig. 3)*

The ring counter designated as 100 in the overall block diagram of Fig. 1 is detailed in Fig. 3. As shown in Fig. 3, the ring counter comprises a series of 11 identical bistable stages $100_1 \ldots 100_{11}$ only the first and last being illustrated in detail. The counter stages disclosed are of the type commercially identified as an Audio Products Company Pakap Type 105 ring counter stage. Each stage includes a twin triode $V300a$, $V300b$ of the 12AU7 type. One cathode 302 of each stage is connected to input terminal 301 which, as shown in Fig. 1, is connected to a pulse generator through conductor 109a. As will be described, pulse generator 109 shown in Fig. 1 supplies clock-controlled negative pulses which are applied to terminal 301. For purposes of explanation, the normal condition or state of each stage can be assumed to be that in which the left-hand triode $V300a$ is conducting so that the indicator glow tube $V300c$ associated with each such triode is unlighted. The output terminal 303 of the eleventh stage $100_{11}$ is connected through lead 308a back to the grid input terminal 304 of the left-hand triode $V300a$.

Before operation of the converter apparatus commences, ring counter 100 rests on stage $100_{11}$. That is, stage $100_{11}$ is turned on while all other stages are turned off. Since stage $100_{11}$ is on when its right-hand triode $V300b$ is conducting, the introduction of a negative "start" signal initiated pulse at input terminal 301 will act to trigger stage $100_{11}$ to the defined normal condition and thereby advance the count to stage $100_1$. Succeeding pulses will similarly act to advance the count to stage $100_2$ and so on to stage $100_{11}$.

The output terminal $303_1$ of the first counter stage $101_1$ is connected, as indicated in Fig. 1, to the input of an ON gate $106_1$ while the remaining terminals $303_2 \ldots 313_{11}$ associated with each of the remaining counter stages $100_2 \ldots 100_{11}$ are similarly connected to a corresponding number of the remaining ON gates $106_2 \ldots 106_{11}$ and to each of ten OFF gates $107_1 \ldots 107_{10}$, as shown in Fig. 1. In this manner a negative output pulse is delivered to the respective gating circuits from each counter state as it is turned on in sequence by the pulse generator 109.

Briefly it may be mentioned at this point that the immediate purpose and function of the ring counter 100 described is to initiate the standardizing pulses which subsequently form the standard signals $E_d$ applied to the comparator 500 (Fig. 1) and compared therein with the input analogue signal voltage $E_x$ as will be described in detail.

ON and OFF gates 106, 107 (Fig. 6)

As shown in the block diagram of Fig. 1, the converter further includes a first bank of on-gates designated as $106_1$ through $106_{11}$, and a bank of off-gates designated as $107_1$ through $107_{10}$ in Fig. 1. Such gating arrangement is detailed in Fig. 6 of the drawings as comprising a series of and-gates of known construction. As shown in Fig. 6 the on-gate arrangement 106 consists of a series of and-gates, each of which comprises a tube $V604_1 \ldots V604_{11}$, of the 6AS6 type having a plurality of grids, each of which may be independently and separately biased. As is well known, the action of a multigrid tube as a gating device, depends upon the coincidence of signals applied to each of the grids. Conduction of a gating tube is established only when each of the grids is concurrently energized. As shown in Fig. 6, input terminal 600 is connected in parallel to the first grid of each of the gate tubes $V604_1 \ldots V604_{11}$. The second grid of each tube is connected in parallel to a source of potential applied at terminal 601 while the third grid of each tube is identically connected to respective input terminals designated as $602_1$ through $602_{11}$. Each of the gating tubes is provided with a separate output terminal designated as $603_1$ through $603_{11}$ which are connected to the flip-flop stages of the staticizer 101 shown in Fig. 1 through respective leads 106A as will be described.

The off-gates $107_1$ through $107_{10}$ are similar in construction to the described on-gates. The off-gates comprise a series of 10 6AS6 type multigrid tubes, $V605_1$ through $V605_{10}$. The first controlled grid of each tube is connected in parallel to an input conductor 606, the second grid of each tube is paralleled to a terminal 607, and the third grid of each tube is separately connected to a terminal $608_1$ through $608_{10}$ as shown in Fig. 6. The referred to signal input line 606 to the off-gates is connected to a comparator gate 105 which, as shown in Fig. 6, comprises a triode V609 and a multigrid tube V610 of the 6AS6 type. The tube V610 has two controlled grids having inputs 611 and 612, respectively. The terminal 612 is connected to receive the output of delay pulse generator 111 shown in Fig. 1 while the terminal 611 is connected to receive the output of the comparator 500. The purpose of the tube V609 is to invert the output signal obtained from the gating tube V610 so that upon conduction of the gating tube a positive pulse will be transmitted through line 606 for concurrent application to the off-gates $107_1$ through $107_{10}$.

Staticizer register 101 (Fig. 4)

The staticizer register 101 shown in Fig. 1 consists of a series of bistable flip-flop stages $101_1 \ldots 101_{10}$ of the type detailed in Fig. 4. One terminal 400 of each flip-flop stage is, as shown in Fig. 1, connected by leads 106a to receive the output of a respective one of the on-gates $106_1$ through $106_{10}$ while the second input 401 of each flip flop 101 is obtained from each of the off-gates $107_1 \ldots 107_{10}$ through a respective or-gate $108_1 \ldots 108_{10}$ by leads 108a. As shown in Fig. 4 each flip-flop stage consists of a twin triode $V403_a$, $V403_b$ of the 6J6 type the cathodes of which are tied together, the anodes being cross-coupled in a known manner. The construction and operation of such circuit is conventional and is fully described in pages 96-98 of "Electronics Experimental Techniques," by Elmore and Sands. To permit driving of the diode circuit of the decoder 700 to be described when a particular flip-flop stage is in an "off" condition, the left-hand triode $V408_a$ is connected to a 150-volt source while the right-hand triode $V403_a$ is applied to a 250-volt source. Each stage is provided with two described input terminals 400 and 401 and an output signal is obtained from terminal 402 as shown in Fig. 4 for application to the decoder 700. Negative pulses are applied from an associated on-gate 106 and or-gate 108 respectively to either of the input terminals 400 and 401 through leads $106_a$ and $108_a$ (see Fig. 1). The normal condition of the flip-flop stage shown in Fig. 4 is that in which the left-hand triode $V403_a$ is normally conducting. Such condition or state is the equivalent of registering a binary "0" in the stage. The application of a negative pulse to terminal 400 as will be described acts to cut off $V403_a$ and drive $V403_b$ to conduction with the resultant transmittal of a negative output pulse through output terminal 402 for application to the decoder 700. Such condition of the stage is equivalent to the registration of a binary "1." The stage can then be reset to its initial condition by the application of a negative pulse to the second input terminal 401. The flip-flop register 101 thereby functions to staticize or memorize the dynamic pulses applied thereto from the preceding gating circuitry.

The decoder 700, 710, 720 (Figs. 7a, 7b)

The decoder which is illustrated in Figs. 7a–7b of the drawing is a digital-to-analogue converter circuit which is arranged to translate a 10-bit parallel digital code applied as an input into a corresponding analogue output signal having a range which varies between $\pm 1\frac{1}{2}$ volts. The type of decoder mechanism employed with this invention combines a high degree of accuracy, high reliability, and commensurate high speed of operation to a degree not heretofore attainable.

The decoder mechanism according to the present invention employs a drift stabilized, direct coupled, negative feedback analogue summing amplifier together with a summation network in a novel manner. The principles of operation of such device are illustrated in Figs 8a and 8b of the drawings which are shown under Fig. 2f. Fig. 8a shows the principle of operation of a conventional summation amplifier 800 including a feedback resistor $R_f$ and a plurality of branched input circuits R through $R_n$. The general operation of such type of summation network is well known and is described on pages 644 through 645 of volume 19 of the Radiation Laboratory Series entitled, "Waveforms," published by McGraw-Hill. It can be shown in connection with such circuit that the output voltage $e_0$ obtainable is related to the input signals $e_1$, $e_2, \ldots e_n$ according to the following equation:

$$-e_0 = e_1\frac{R_f}{R_1} + e_2\frac{R_f}{R_2} + e_n\frac{R_f}{R_n}$$

If the input impedances $R_1$ through $R_n$ as well as the feedback resistor $R_f$ are made equal, this circuit will produce an output signal $e_0$ which represents the negative sum of the various input voltages $e_1$ through $e_n$. It is also evident that if the above-described resistors are equal in value then it is only necessary to multiply each input voltage $e_n$ by a constant which is determined by the ratio of $$\frac{R_f}{R_n}$$

Fig. 8b shows in principle how the summation circuit described in connection with Fig. 8a may be employed as a digital-to-analogue converter. The ratio of each of the input resistors $R_1$–$R_n$ shown in Fig. 8a is selected to conform with the same equation ($2^n$) previously referred to as determining the binary code for the decimal numbers. Thus, using the ohmic value of the first resistor R as the standard, the next resistor has a weighted value equal to twice that of the first resistor, namely, 2R, followed by a resistor having the value 4R, then 8R, etc. With such an arrangement the output voltage $e_0$ may be expressed by the following equation:

$$e_0 = -ER_f \left[ B_9\left(\frac{1}{2^0 R}\right) + B_8\left(\frac{1}{2^1 R}\right) + B_7\left(\frac{1}{2^2 R}\right) + \ldots B_0\left(\frac{1}{2^9 R}\right) \right]$$

Where $B_n$ may equal 1 or 0 depending on the setting of the switches 802.

Fig. 8b further shows each of the resistors $R-R_n$ as being connected to a respective switch 802 having contacts $802_1$ and $802_2$. Each of the contacts $802_2$ are connected to ground while each contact $802_1$ is connected by a lead 813 to a voltage source maintained at a standard potential E. The switches 802 enable each of the resistors R . . . $R_n$ to be selectively connected to either of the two voltage levels represented by E and ground potential respectively. The various stages $101_1$ . . . $101_{10}$ of the staticizer described in connection with Fig. 1 are symbolically shown in Fig. 8b as functionally actuating a respective switch 802. In this manner should a binary "1" be staticized in a particular stage of the register 101, the associated switch will be connected to terminal $802_1$, which is at voltage E, whereas should a binary "0" be registered in a staticizer stage, the switch 802 will connect with terminal $802_2$ which is at ground level.

The resistors R . . . $R_n$ shown in Fig. 8b are arranged in order of increasing value as indicated and, it is apparent from the values illustrated, that the resistors are weighted in accordance with binary coded decimal values as determined by the referred to equation $2^n$ where $n$ corresponds to the digit order-level of the pulse-coded representation. Moreover, there are ten identical parallel branch circuits, $800_1$ . . . $800_{10}$ provided in connection with the decoder each comprising a voltage source E, a switch 802 and a resistor $R_n$ of predetermined value. That is, there is one branch corresponding to each of the staticizer stages 101 (Fig. 1). Since the applied voltage E for each branch is the same, the resultant current flow through any particular resistor $R_n$, when the switch 802 is engaged with a contact $802_1$ will be inversely proportional to the value of the resistor in that branch. Thus, for each branch in the network, $$I_n = \frac{E}{R_n}$$

where $R_n$ has the progressive values as determined by the function $2^n$. In accordance with the circuit parameters shown in Fig. 8b the current flow through each subsequent branch circuit beginning with R will be ½ of the current flow through the preceding branch circuit. That is, the current flow through branch $800_2$ will be ½ the flow through $800_1$ for the same impressed voltage etc.

Therefore if the same standard voltage signal E is applied to each terminal of the various branch circuits $800_1$ . . . $800_{10}$ the output obtained from each branch will have an assigned value weighted proportional to the value of the respective resistor $R_n$ in each branch circuit. The largest output will be obtained from branch $800_1$ and each subsequent branch $800_2$ . . . $800_{10}$ will yield a progressively smaller weighted output signal. Since the signal derived from branch $800_1$ will have the largest amplitude quantum such circuit may represent the digit order place of highest level in the pulse-coded representation, while each subsequent branch $800_2$ . . . $800_{10}$ will represent respectively a digit order place of progressively lower order-level. A practical circuit embodying the principles illustrated in connection with Fig. 8b may be implemented in the form shown in Figs. 7a–7b.

In Fig. 7a the input resistors R, 2R, etc. referred to in connection with Fig. 8 are represented by the odd numbered resistors $R_{11}$, $R_{13}$, $R_{15}$, $R_{17}$ . . . $R_{29}$. The ohmic values of these resistances are indicated by Fig. 7a and, as is apparent, their values are related in accordance with the $n$-powers of 2 as described. The various stages $101_1$ . . . $101_{10}$ of the staticizer 101 shown in Fig. 1 are also shown in Fig. 7a as being connected to the left-hand plate of a respective 6AL5 type of twin diode gate designated as V701 in the drawing, by means of the leads $101_a$. Ten such diodes are provided as indicated. The cathode of each such tube V701 is biased by an individual cathode resistor such as R704, and the cathodes are in turn connected in common to a negative voltage source as shown. The terminal between the second anode of each gating tube V701 and each of the described odd numbered resistors $R_{13}$ through $R_{29}$ is shunted to ground by a plurality of even numbered resistors such as $R_{14}$ through $R_{30}$ having one end connected to ground potential as shown. The common junction 703 of the odd numbered summation resistors $R_{13}$ . . . $R_{29}$ has a very low impedance to ground which is determined by the ratio of the value of the feedback resistor $R_f$ to the amplification factor or gain of the decoder amplifier 710, 720 shown in Fig. 7b. By choosing an amplifier having a high gain value, such as over 1000, for example, such impedance can be maintained less than 0.1% of the parallel resistance of all the summing resistors $R_{13}$ . . . $R_{29}$. The plate load for the tube V701 in the branch $700_1$ associated with the first resistor $R_{11}$ is 2000 ohms, and the even numbered resistors $R_{14}$ through $R_{30}$ are so chosen that the plate load on the remaining tubes V701 in the branches $700_2$ . . . $700_{10}$ is also made equal to 2000 ohms. If the tubes V701 are then operated so that each applies an equal amount of current to such load, then it is obvious that the voltage signal supplied as an input to each of the (odd numbered) summing resistors $R_{11}$ . . . $R_{29}$ will be equal and consequently the signal output across odd numbered resistors $R_{11}$ . . . $R_{39}$ will be weighted progressively downward commencing with branch $700_1$ and continuing to branch $700_{10}$ in accordance with the theory discussed in connection with Figs. 8a and 8b.

The cathode resistors R704 provide for such equal current distribution to the load resistors. By choosing cathode resistors which have an ohmic value which is equal to at least 1000 times that of the expected variation in the plate resistances, it can be determined that the currents in all the right-hand sides of the diodes V701 in each of the branches $700_1$ . . . $700_{10}$ will be equal to within 0.1 percent if all the left-hand diodes are cut off by holding each left-hand plate negative a few volts with respect to ground. The left-hand diode thereby acts as a gate to control conduction in each of the right-hand diodes. That is, the left-hand diode of each of the diodes V701 is normally conducting. When a respective one of the stages of the staticizer 101 is actuated, a negative pulse is applied to the anode of the left-hand diode and such sections is rendered nonconducting. Since the cathode is connected to a negative source as shown, the right-hand section of the effected tube will conduct since the second anode of the tube is connected to a positive source as shown. The diodes V701 thereby function in a manner analogous to the switches 802 shown in connection with Fig. 8b. Thus, as each of the staticizer stages 101 is energized in sequence starting with stage $101_1$ and continuing through stage $101_{10}$ as will be described, the corresponding right-hand section of the gating tubes 701 in each branch commencing with branch $700_1$ will be energized in sequence thereby producing a weighted output signal due to the described effect of equal current flow established in each of the differently weighted resistors respectively. Comparing the embodiment shown in Fig. 7a with the explanatory circuit of Fig. 8b it will be apparent that when a binary "1" is registered in a staticizer stage 101 a standard weighted signal ($E_d$) will be manifested across a respective load resistor, and that when such staticizer stage registers a binary "0" there will be no such output manifested. The conditions explained in connection with Fig. 8b are therefore available in the practical construction of Fig. 7 and it will be apparent that the summation circuit will thereby produce a voltage signal the amplitude of which will represent in analogue form, the applied binary word. By employing resistors of 0.1% accuracy and a D.C. amplifier having a gain of greater than 1000 a decoder according to the present construction can be made accurate to the extent of 10 bits or 0.1%.

In order to obtain an accuracy and stability within the required specification of 0.1%, it is only necessary to employ a high stability ±0.05% precision wire-wound resistor in the branch of highest weighted value of the decoder network ($R_{11}$ in Fig. 7a) while the precision requirements of the remaining resistors may be reduced progressively proportional to the weighting values.

The output of the resistor network of the decoder 700 is applied from terminal 703 to the input of the amplifier 710, 720 detailed in Fig. 7b which is the embodiment of the amplifier represented by reference numeral 800 in Fig. 8b. The amplifier comprises a first amplifier 710 as shown in Fig. 7b which is a drift stabilized, direct coupled, negative feedback summation type amplifier the circuit parameters of which are completely detailed in the drawing. The general construction and operation of such type of amplifier is described in an article by Edwin A. Goldberg appearing in the RCA Review, vol. XI, No. 2, pages 296–300 entitled, "Stabilization of Wide-Band Direct-Current Amplifiers for Zero and Gain." Briefly, the D.C. amplifier 710 is stabilized for offset and drift by utilizing the auxiliary amplifier 720 shown in Fig. 7b. The mechanical chopper V721 is employed to change the D.C. voltage obtained from the summing terminal 703 of the network into an A.C. voltage at contact 721. The tubes V724 and V725 are employed as an A.C. amplifier, the output of which is rectified at contact 722 of the chopper V721 and filtered by R726 and C727 and applied through conductor 728 to the input of the V712 stage of D.C. amplifier 710. A theoretical analysis of the operating principle of such amplifier combination is given in the referred to Goldberg article and the details of a complete operating circuit having the desired characteristics appear in Figs. 7a and 7b. For reasons that will appear, due to the controlling action of the staticizer stages 101, the output signal obtained from the decoder amplifier at terminal 704 is maintained within ±1.5 millivolts of ground when the correct code has been found.

*The comparator 500 (Fig. 5)*

The function of the comparator 500 is to determine if the analogue signal output obtained from the decoder 700, which is a decoded standard signal, is larger or smaller than the sampled voltage signal to be coded. That is, in accordance with the described theory, the sampled analogue signal must be compared with the standard binary value proportional signal. If the standard analogue output signal $E_d$ of the decoder is larger, the comparator must supply a pulse to turn off the flip-flop stages of staticizer 101 corresponding to the word bit previously added. On the other hand, if the voltage to be coded $E_x$ is larger than the standardized signal voltage output of the decoder then the flip-flop stage of the staticizer is left on.

Figure 5:
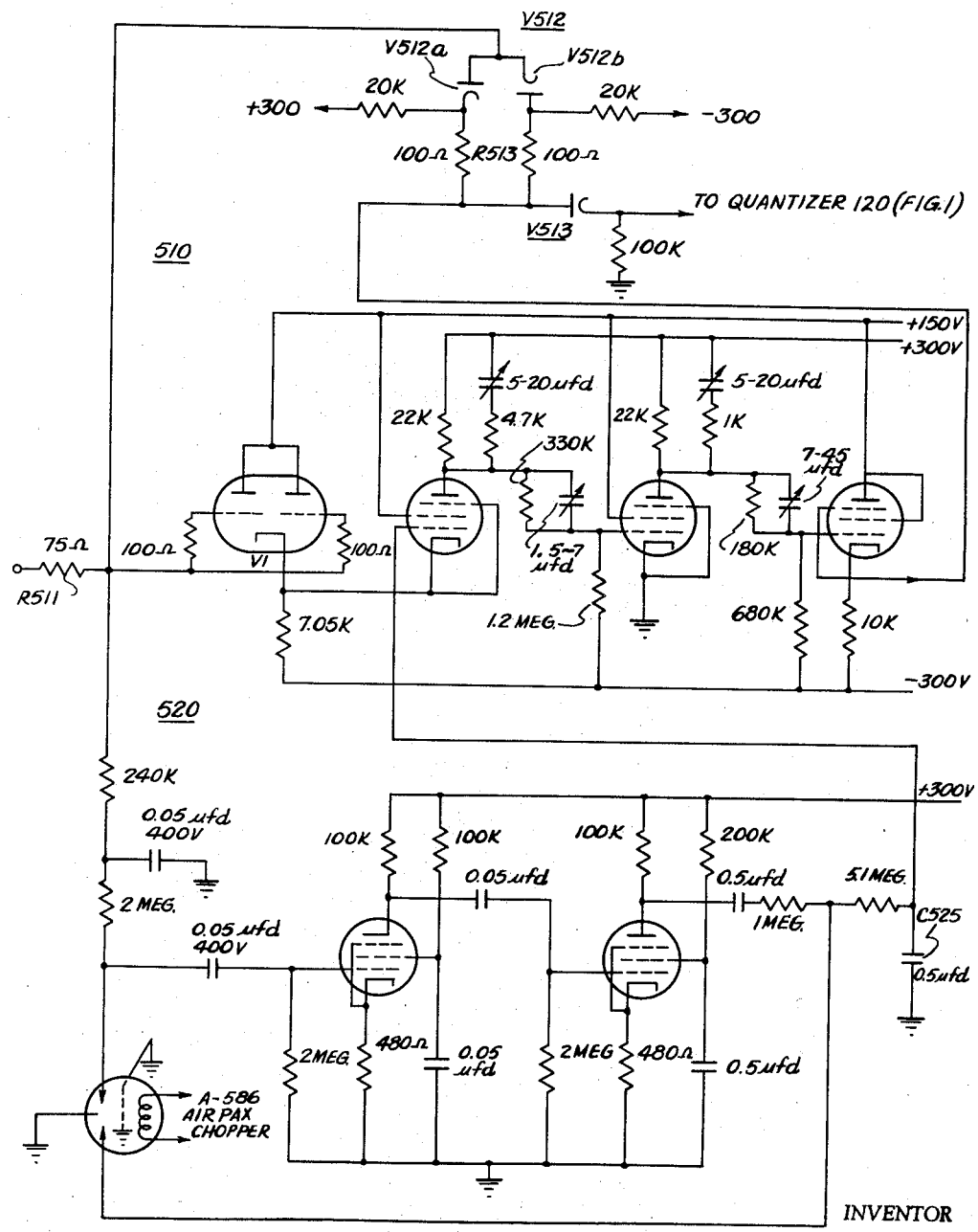
Fig. 5 is a circuit diagram of the novel comparator employed.

The comparator 500 consists of a chopper stabilized, wide band D.C. amplifier having nonlinear feedback as shown in Fig. 5. It is similar in construction and function to the amplifier 710, 720 detailed in Figs. 7a and 7b. The A.C. portion 520 of the amplifier differs from the corresponding amplifier portion 720 with respect to the value of the filter condenser C525 while the D.C. portion 510 of the amplifier employs an input resistor R511 and a feedback network comprising the inversely connected diodes $V512_a$, $V512_b$. The output is fed through a third diode V513 to the quantizer 115 of Fig. 1. The resistor R511 is made equal to the value of the feedback impedance as determined by the circuit including the diode pair $V512_a$, $V512_b$ and the resistors R513, R514, giving the amplifier unity gain.

When the correct code has been determined, the output of the decoder amplifier 710, 720 will be within ±1.5 millivolts of ground as described. It is therefore necessary that the comparator circuit 500 produce an output signal pulse suitable to energize the off-gates $107_1$ . . . $107_{10}$ at any instant in which the input signal applied to the comparator 500 exceeds +1.5 millivolts and to recover after the application of any input signal between ±1½ millivolts.

The design of the comparator amplifier circuit provides such operative features because of the inclusion of a nonlinear feedback in the form of the biased diodes $V512_a$ and $V512_b$. These diodes are provided with a bias of approximately one volt and, because of their inverse connection, no feedback can exist for any condition in which the output level lies within ±volt, the summation point being maintained at ground potential. For signals in the order of ±0.5 millivolt, therefore, the full (unity) gain of the amplifier is effective. When the signal exceeds such value, one or the other of the inversely connected diodes will conduct providing the desired degree of negative feedback to prevent the output level from ever exceeding the diode bias by more than a few tenths of a volt. Such clipping action prevents overloading the wide-band D.C. and chopper amplifiers 510 and 520, respectively. The signal derived from diode V513 is subsequently applied to each of the off-gates $107_1$ . . . $107_{10}$ through quantizer 120 and comparator gate 105 as shown in Fig. 1. The arrangement is such that the off-gates are energized when the comparator output swings negative because of the inhibitor type comparator gate 105 employed.

The theory of operation of a suitable comparator of this type is described in an article entitled "An Analogue-to-Digital Converter with an Improved Linear Sweep Generator," by Dean W. Slaughter, appearing on pages 7–12, I.R.E. Convention Record, No. 7, 1953.

The over-all operation of the converter circuit shown in Fig. 1 can now be described inasmuch as the function and construction of the remaining control circuits will become apparent following such description.

*Overall operation (Fig. 1)*

Upon energization of clock gate 103, clock pulses applied at terminal 912 (Fig. 1) will initiate and synchronize clock pulses $CP_1$ from pulse generator 109 and, after a slight delay produced by phantastron 110, delayed clock pulses $CP_2$ from pulse generator 111.

The ring counter or signal commutator 100 described is operated upon application of the clock pulses $CP_1$ from pulse generator 109 as a conventional scaling counter. That is, each trigger stage $100_1$, $100_2$, $100_3$ . . . $100_{11}$ is operated in sequence. Actuation of stage $100_{11}$ clears or resets the counter chain. Since each stage $100_n$ of ring counter 100 is connected by a respective lead $303_1$ . . . $303_{11}$ to a respective and-gate $106_1$ . . . $106_{11}$ comprising the on-gate 106, it is apparent that such gate is rendered conducting in sequence in timed relation with the clock pulses $CP_2$. The clock pulses from pulse generator 111 are delayed slightly with respect to clock pulses from generator 109 by the phantastron circuit 110. The output from the particular one of the on-gates 106 which is thereby actuated will energize a respective one of the bistable stages $101_1$ . . . $101_{10}$ of the staticizer 101 through the connecting leads $106_a$ joining each of the on-gates $106_1$ . . . $106_{10}$ with a respective one of the staticizer stages. All but the first ($100_1$) stage of the commutator chain 100 is also connected by the leads $302_2$ . . . $303_{11}$ respectively to each of the 10 and-gates $107_1$ to $107_{10}$ comprising the off-gates 107. When energized, the output from each off-gate, applied through an or-gate $108_1 \ldots 108_{10}$ will be applied to and turn off the respective stage of the staticizer register 101. Each of the off-gates $107_1 \ldots 107_{10}$ also requires for energization an output pulse from comparator gate 105.

The comparator gate 105 is a conventional and-inhibit gate of the type described on page 38 of "High-Speed Computing Devices" and provides an output signal which is applied through an inverter $105_a$, to each of the off-gates $107_1 \ldots 107_{10}$ in unison as shown in Fig. 1, when energized by a delayed clock pulse $CP_2$ and if not inhibited by an output signal from comparator 500.

At this point in the description, the condition of the apparatus shown in Fig. 1 can be summarized as follows:

(1) Ring counter 100 normally rests on stage 11 (stage 11 conducts).

(2) With switch SW1 in position 1, a start pulse applied at terminal 902 will, through or-gates $108_1 \ldots 108_{10}$, conductor $112a$ and contact 1 of SW1 and the clear pulse inverter 116, clear all 10 of the staticizer stages $101_1 \ldots 101_{10}$.

(3) The start pulse applied through pulse shaper 112 will open clock gate 103 and clock pulses from pulse generator 109 will thereby advance ring counter 100 from stage $100_{11}$ to stage $100_1$ which readies on-gate $106_1$ and no other; clock pulses delayed by phantastron 110 are applied by pulse generator 111 to then turn on the on-gate $106_1$ which has been readied by previous energization of register stage $100_1$.

(4) On-gate $106_1$ which now conducts, turn on stage $101_1$ of staticizer 100. As is apparent from Fig. 7a energization of staticizer stage $101_1$ results in the switching in of the maximum weight resistor in the resistor bank with the resultant transmission of a decoded standard analogue voltage $E_d$ to the comparator 500.

(5) Comparator 500 as described compares the unknown signal $E_x$ which is applied at terminal 117 (Figs. 1 and 7b) with such $E_d$ signal and:

(a) If $E_x > E_d$, comparator 500 sends an output signal to inhibit comparator gate 105 (which is an and-inhibit gate);

(b) If $E_x < E_d$, there is no signal output from the comparator and gate 105 is not inhibited.

(6) If gate 105 is inhibited as when $E_x > E_d$:

(a) The next clock pulse $CP_1$ can have no effect on off-gate $107_1$ and therefore stage $101_1$ of the staticizer is unaffected and stays on—while, due to the triggering of register stage $100_2$ and the consequent conduction of gate $106_2$, the next staticizer $101_2$ is turned on as a result of the action of the referred to clock pulse $CP_1$;

(b) If gate 105 is not inhibited as when $E_x < E_d$, then when said subsequent clock pulse $CP_1$ energizes counter stage $100_2$, the latter will feed a pulse to off-gate $107_1$ which, when applied through the or-gate $108_1$, will turn off staticizer stage $101_1$ and on-gate $106_2$ will conduct due to coincidence between signals from counter stage $100_2$ and said delayed clock pulse from pulse generator 111.

(7) The effect of the above action is to turn on the next subsequent staticizer register stage $101_2$ and the described action is repeated cutting off each preceding bistable staticizer stage so long as comparator gate 105 is not inhibited—and it will not be inhibited as long as $E_x < E_d$—until counter stage $100_{11}$ becomes energized. Energization of stage $100_{11}$ will turn off staticizer stage $101_{10}$ and, through the circuit comprising contact 1 of SW1, and lead 400, will cut off signal gate 102 to block the clock pulses, thus halting further operation of the converter with those stages of the staticizer 101 being left in an energized state which were not turned off as determined by $E_x$ being larger than $E_d$. The reading of the staticizer register stages $101_1 \ldots 101_{10}$ may, if desired, be transferred in a conventional manner to any desired utilization device.

Summarizing, so long as there is an output from comparator 500 (and there is so long as $E_x > E_d$) each preceding ring counter stage 100 is kept energized while each subsequent one is turned on. But as soon as $E_x < E_d$, then, as the next subsequent ring counter stage 100 is energized in timed relation with the clock pulses $CP_1$, the preceding off-gate 107 will be actuated to turn off the respective preceding one of the staticizer stages 101.

When switch SW1 is in the "clear" position (position No. 2 in Fig. 1), the coder operates in the described manner with the exception that the application of a "start" pulse is ineffectual and does not act to clear the staticizer register 101 through conductor $112_a$ and the clear pulse inverter 116 as described, since the staticizer will be self-clearing under such mode of operation. That is, the application of the 11th delayed clock pulse $CP_2$ will have caused on-gate $106_{11}$ to conduct with the resultant transmission of a signal through terminal 2 of SW1 and clear pulse inverter 116 to turn off all of the stages of the staticizer register 101 through the or-gates $108_1 \ldots 108_{10}$, but will not stop operation of the converter as in position 1 of the switch.

With the switch SW1 in position 3 (halt-clear) the same 11th pulse will act through terminals 3—3 of SW1 to both clear the staticizer 101 and, through conductor 400, to shut off the converter by flipping the control circuit 102 to its "halt" state. Such action cuts off clock gate 103 and halts coding.

It is now possible to correlate the general objectives and principles discussed in connection with Figs. 2a–2f with the implementation of such objectives as mechanized in the circuitry and explained in connection with Fig. 1.

It has been stated in connection with Figs. 2a–2f that each of the standard pulses $B_d$ shown in Fig. 2c which correspond in amplitude to a particular $2^n$ quantum value (1, 2, 4, 8, etc.) can be compared with the pulses forming the unknown sampling waveform $B_x$ in Fig. 2a. The circuit of Fig. 1 provides means for effecting such comparison in the following manner: when stage $100_1$ of the ring counter is turned on by a clock pulse, it emits a standardizing pulse corresponding to the highest order-level as determined by the formula $2^n$, for example, the "16" pulse in Fig. 2c and such signal is staticized in stage $101_1$ of staticizer 101.

In accordance with its described action, the decoder 700 converts such pulse into a weighted standard analogue signal $E_d$ which is applied to the comparator circuit 500 together with the analogue signal $E_x$ as symbolized in Fig. 1. According to the described mode of operation, if $E_x > E_d$, the said staticizer stage $101_1$ is left on and the next stage $100_2$ of the ring counter will by this time furnish a standardizing pulse corresponding to the next lower order level as determined by $2^n$ as, for example, the pulse "8" as represented in Fig. 2c. This new $E_d$ standard pulse is compared with $E_x$ in comparator 500 and if $E_x$ is still greater than $E_d$ the process is continued until a point is reached wherein $E_x < E_d$. In this instance, as described, the comparator gate 105 is not inhibited and the particular stage $100_n$ of the ring counter which has, in effect, sensed such point will act together with gate 105 to cut off the preceding stage of staticizer 101 following which all subsequent staticizer stages will be cut off until the $100_{11}$ counted stage is triggered and the cycle is stopped. Thus the desired code corresponding to the sampled analogue signal will be registered in the stages of staticizer 101 which remain energized.

The over-all description of the converter circuit of Fig. 1 having been explained, the specific construction of certain of the remaining control circuits which have been broadly referred to is described below.

Fig. 9 shows the circuit construction of the pulse shaper 112, the halt-run signal gating flip-flop circuit 102, clock gate 103, quantizer 113, pulse generator 109 and delay element 110 all of which are symbolically shown in Fig. 1.

The pulse shaper 112 comprises a twin triode V901 of the 12AU7 type. Negative start pulses are applied at terminal 902 while a second terminal 903 is connected through lead 112a to contact 1 of the switch SW1 as shown in Fig. 1. The anodes of tube V901 are cross-coupled to form a conventional multivibrator circuit, the left-hand triode being normally conducting. The pulse shaper will therefore produce a negative square wave output signal which may be obtained from the first grid of the pulse shaper and is applied through capacitor C904 and diode V905 to the first half of a 6J6 type twin triode V906 comprising the signal gating circuit 102. The duration of such square wave is determined by the time constant of the multivibrator V901. The application of a negative "start" pulse to input terminal 902 from an external source, will therefore energize the pulse shaper 112 and also transmit a clearing signal through conductor 112a to contact 1 of SW1 for the described purpose.

*Halt-run signal gating circuit 102*

The halt-run signal gating circuit 102 is a conventional bistable stage which has two modes of operations "run" and "halt." The left-hand triode (run) is grid controlled by the signal from the pulse shaper 112. The right-hand triode (halt) is coupled through diode V906 (Fig. 9) and capacitor C907 and conductor 102a (Fig. 1) to contact 3 of the switch SW1 which in turn is connected to the output of the one-gate $106_{11}$ and to staticizer 100 through the or-gates 108, as described. The "run" triode of gating circuit 102 is normally conducting and the application of the referred to negative signal from the pulse shaper to the grid of such triode drives it to cut off. The resultant transfer of a positive pulse to the grid of the "halt" triode renders the latter triode conducting with the consequent transfer of a negative pulse from the plate of the "halt" triode through conductor 908, resistor R909, capacitor C910 to the first grid of the clock-gate 103.

The clock-gate 103 detailed in Fig. 9 comprises a twin triode V911 of the 12AU7 type having its anodes tied together. Negative clock pulses from an external source are applied through terminal 912 (Figs. 1 and 9) and capacitor C913 to the second grid of tube V911. The clock-gate thereby delivers a positive pulse upon concurrence of the two negative pulses comprising, the output of the signal gating flip-flop 102 and the applied clock pulses respectively. The output from the clock-gate is applied through conductor 102b to the first grid of a quantizer 113.

*Quantizer 113*

Quantizer 113 comprises a twin triode V913 of the 12AU7 type as shown in Fig. 9. The left-hand triode is normally cut off and conducts when the positive pulse from the clock-gate 103 is applied to its grid. The output of the quantizer is obtained from the anode of the right-hand triode which is cut off when the left-hand triode conducts. The quantizer, in such manner, delivers a positive signal to the pulse generator 109.

*Pulse generator 109*

Pulse generator 109 indicated in Fig. 1 and detailed in Fig. 9 is a standard PAKAP 109 generator made by the Audio Products Corporation comprising a twin triode V917a, V917b of the 5687 type. The anode of V917a is connected to a transformer T918 having a primary 918a and secondary 918b. The primary 918a delivers a pulse of negative polarity to the delay mechanism 110, while the secondary 918b applies a positive pulse to the grid of triode V917b. It is apparent that when triode V917a is driven to conduction by a signal from quantizer 113, a negative pulse will be obtained from primary winding 918a of transformer T918 for application through the delay number 110 to delay pulse generator 111. The referred to delay member 110 comprises a phantastron circuit which provides a 2.5 μsec. before triggering the delay pulse generator 111 which is essentially of the same construction as pulse generator 109. A description of a conventional phantastron delay circuit can be found on page 592 of "Electron Instruments," Radiation Laboratory Series, vol. 21. The delay pulse generator 111 applies the clock controlled pulses to both the or-gate 106 and to the comparator gate 105 in the manner already described.

While a particular embodiment has been illustrated and described, it is apparent that the invention is not necessarily limited to the particular combinations of exemplary components shown. For example, the various signal gating circuits can readily be embodied in any conventional equivalent form as will be obvious to those skilled in the art. The signal commutating circuit is not necessarily restricted to a bistable ring counter arrangement since any type of periodic operable control device such as a stepping switch will suffice for such purpose. The construction of the staticizer register may also be varied to a considerable degree while many optional equivalents of the pulse shaper, pulse generators, and the phantastron are also readily apparent.

It is therefore not intended to restrict the invention otherwise than to the extent indicated in the appended claims.

What is claimed is:

1. A coding apparatus for converting an analogue signal into a binary pulse-coded representation symbolized by $n$-digit order places comprising, a pulse generator for establishing a time base, a cyclically operated ring counter responsive to said pulse generator for generating a series of periodic sequentially occurring like time spaced standardizing pulses equal in number to said digit order places, in which the period of occurrence of a pulse corresponds to the level of the order place, a staticizor register for staticizing in time sequence corresponding to said time base each of said standardizing pulses in order of occurrence comprising a plurality of energizable signal storing stages equal in number to said digit order places, control means connecting said ring counter to each of said signal storing stages for selectively deenergizing each of said storing stages, the control means connected to the stage representing a higher level digit order place being connected to receive the standardizing pulse corresponding to the next lower level digit order place, a decoder connected to each of said signal storing stages for converting each stored pulse in order of occurrence into a standard reference signal having an assigned amplitude value weighted in accordance with $2^n$ where $n$ represents the order place represented by said stage, a comparator circuit responsive to said analogue and each of said reference signals consecutively in order of occurrence and energizable only when said analogue signal exceeds in magnitude said reference signal and signal gating means responsive to the outputs of said comparator circuit and said pulse generator connecting said comparator circuit to said control means.

2. A coding apparatus for converting an analogue signal into a binary pulse-coded representation symbolized by $n$-digit order places comprising, a pulse generator, a cyclically operated ring counter responsive to said pulse generator for generating during each cycle in periodic sequence a series of standardizing pulses each occurring at a progressively longer time interval as measured from the beginning of each cycle and corresponding respectively in period of occurrence to the level of a digit order place, a staticizer register for concurrently staticizing each of said standardizing pulses in order of occurrence compriisng a plurality of energizable signal storing stages equal in number to said digit order places, and energizable respectively by each of said standardizing pulses in order of occurrence, a control device connecting said ring counter to each signal storing stage and adapted to deenergize said stage, each of said control devices being energizable only by a standardizing pulse occurring at a time period immediately subsequent to the period of occurrence of said staticized standardizing pulse, a decoder connected to each of said signal storing stages for concurrently converting each of said staticized pulses in order of occurrence into a standard reference signal having an assigned amplitude value weighted in accordance with $2^n$ where $n$ represents the order place represented by said stage, a comparator circuit responsive to said analogue and each of said reference signals consecutively in order of occurrence and energizable only when said analogue signal exceeds in magnitude said reference signal and signal gating means responsive to the outputs of said comparator circuit and said pulse generator connecting said comparator circuit to said control devices.

3. The invention as defined in claim 2 in which said signal gating means comprises an inhibitor signal gate having one input terminal energizable by said pulse generator and a second inhibiting signal input terminal energizable by the output of said comparator circuit.

4. A coding apparatus as defined in claim 2 in which said cyclically operated ring counter comprises a ring of $n+1$ bistable members where $n$ corresponds to the number of digit order places in the coded representation, a first circuit connecting the output of the last bistable member in the ring to the input of the first bistable member and a second circuit connecting said pulse generator to the input of said first bistable member.

5. A coding apparatus for converting an analogue signal into a binary pulse-coded representation symbolized by $n$-digit order places comprisng, a timing pulse source, a cyclically operated standardizing pulse generating means connected to said timing pulse source comprising a series of serially connected bistable members equal in number to said digit order places plus one, circuit means connecting the output of the highest order bistable member to the input of the lowest order bistable member, each energizable in sequence by said timing pulse source whereby the time period of energization of each bistable member identifies said member with a digit order place level in which the highest order level corresponds to the lowest time period and each lower order level corresponds respectively to each subsequent time period, means a staticizor register for concurrently staticizing each of said standardizing pulses in order of occurrence comprising a plurality of energizable signal storing stages corresponding in number and identity to said bistable members, and being concurrently energizable in sequence, a control device connecting said cyclically operating means to each of said staticizer stages and adapted to de-energize said stage, the control device associated with said staticizer stage representing a higher order level being connected with said bistable member identified with the next lower order level, a decoder connected to each of said staticizer stages for concurrently converting each of said staticized pulses in order of occurrence into a standard reference signal having an assigned amplitude value weighted in accordance with $2^n$ where $n$ represents the order place identifying said stage, a comparator circuit responsive to said analogue and each of said reference signals consecutively in order of occurrence and energizable only when said analogue signal exceeds in magnitude said reference signal, and signal gating means responsive to the output of said comparator circuit and said timing pulse source connecting said comparator circuit to said control devices.

6. A coding apparatus as defined in claim 5 including an and-gate coupling each of said $n$ bistable members to a corresponding order-level staticizer stage, an additional and-gate connected to said $n+1$ bistable member, delay means for applying said timing pulse source to said and-gates, selective means for controlling energization of said timing pulse source to initiate a cycle of operation and means connecting the and-gate associated with the $n+1$ level bistable member to de-energize said timing source upon conduction of said last-named gate to terminate said cycle of operation.

7. In a coding apparatus for converting an analogue signal into a pulse-coded representation, decoder for converting a series of applied time-spaced standardizing pulses into a corresponding series of standard reference signals each differing in amplitude by a predetermined quantum, a comparator circuit for comparing said analogue signal successively with each of said reference signals, and means for producing a control effect only when said analogue signal exceeds said reference signal in magnitude comprising a chopper-stabilized wide band D.-C. amplifier having an input terminal connected to said signal converting means, an output terminal, and nonlinear feedback means connecting the output terminal to said input terminal, said nonlinear means comprising a pair of inversely connected diodes in which the cathode of one and the anode of the other are maintained at a potential of equal magnitude and opposite polarity.

8. In a coding apparatus for converting an analogue signal into a pulse-coded representation, a decoder for converting a series of applied time-spaced standardizing pulses into a corresponding series of weighted reference signals, each differing in amplitude by a predetermined ratio comprising a plurality of signal weighting circuits corresponding in number to the number of pulse positions in said coded representation, each of said weighting circuits comprising a signal weighting impedance and being arranged consecutively in order of increasing impedance value, the value of the impedance in each consecutive circuit being twice that in a preceding circuit, circuit for applying said applied standardizing pulses in predetermined periodic order to corresponding ones of said weighting circuits a current source for each of said weighting circuits, diode control means in each circuit including a resistance having a value at least 1000 times the plate resistance of the diode normally isolating said weighting impedance from said current source, a drift stabilized, direct-coupled, high-gain summation amplifier connected to said impedance in each signal weighting circuit for equalizing the total impedance of said circuit to a value which is the same for each of said weighting circuits, and switch means actuated by said standardizing pulses for energizing said diode control means to connect said weighting impedance to said current source.

9. The invention as defined in claim 8 in which said circuit impedance equalizing means comprises a shunting impedance connecting the input side of said impedance to ground potential, and in which the sum of said weighting impedance and said equalizing shunting impedance in each circuit is the same for all weighting circuits.

10. In a coding apparatus for converting an analogue signal into a pulse-coded representation means for converting a series of applied time spaced standardizing pulses of equal amplitude into a corresponding series of weighted reference signals each differing in amplitude by a predetermined ratio comprising a plurality of signal weighting circuits having a common output terminal and separate respective inputs, said circuits being consecutively arranged in order of weighting values, each of said signal weighting circuits comprising a signal weighting impedance which presents the same impedance to the standardizing pulses, said weighting circuits being arranged consecutively in order of increasing impedance value, the value of each consecutive impedance being twice that of a preceding impedance, a staticizor register for applying said standardizing pulses in predetermined periodic order to the separate respective inputs of corresponding ones of said weighting circuits, and switching means connected to each weighting circuit and energizable by each of said standardizing pulses for applying a voltage of predetermined value to each of said weighting circuits, a high gain stabilized D.-C. amplifier connected to said output terminal, a feedback impedance connecting the output of said amplifier to said output terminal and means for applying said analogue signal to said output terminal.

References Cited in the file of this patent

UNITED STATES PATENTS

| | | |
|---|---|---|
| 2,122,748 | Mayer | July 5, 1938 |
| 2,272,070 | Reeves | Feb. 3, 1942 |
| 2,453,454 | Norwine | Nov. 9, 1948 |
| 2,754,503 | Forbes | July 10, 1956 |
| 2,784,396 | Kaiser et al. | Mar. 5, 1957 |
| 2,836,356 | Forrest et al. | May 27, 1958 |

OTHER REFERENCES

Goodall, W. M.: "Telephony by Pulse Code Modulation," The Bell System Technical Journal, vol. 26, No. 3, July 1947, pp. 395–409.

Perley: "Automatic Strain-Gage and Thermocouple Recording on Punched Cards," Journal of the Association for Computing Machinery, vol. 1, January 1954, pp. 36–43.

Tele-Tech and Electronic Industries, March 1955, pp. 72, 73, 142.

Instruments and Automation, May 1956, pp. 911 to 917.

UNITED STATES PATENT OFFICE

CERTIFICATE OF CORRECTION

Patent No. 2,945,220                     July 12, 1960

Arnold Lesti et al.

It is hereby certified that error appears in the printed specification of the above numbered patent requiring correction and that the said Letters Patent should read as corrected below.

Column 15, line 43, strike out "means"; column 16, line 31, after "circuit", third occurrence, insert -- means --.

Signed and sealed this 6th day of December 1960.

(SEAL)
Attest:

KARL H. AXLINE                      ROBERT C. WATSON
Attesting Officer                 Commissioner of Patents